July 21, 1970 M. ALIMANESTIANU 3,521,567
AUTOMATIC SWITCHING SYSTEM FOR PROPELLED CARRIERS
Filed Aug. 21, 1968 4 Sheets-Sheet 1
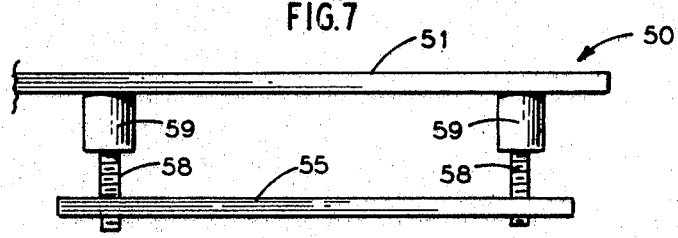
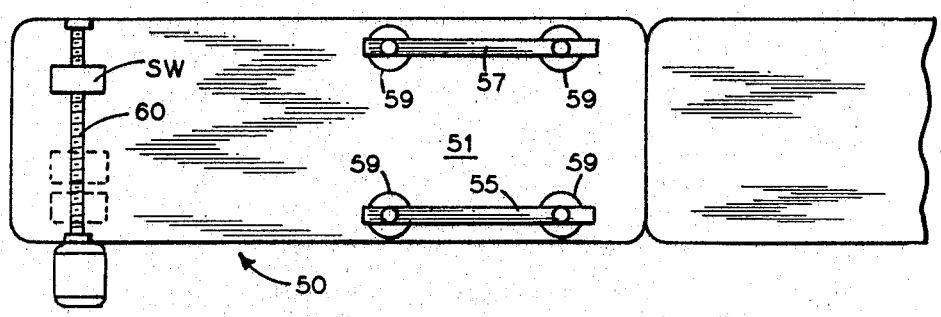
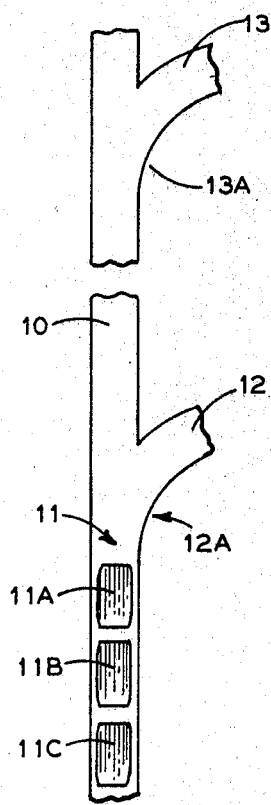
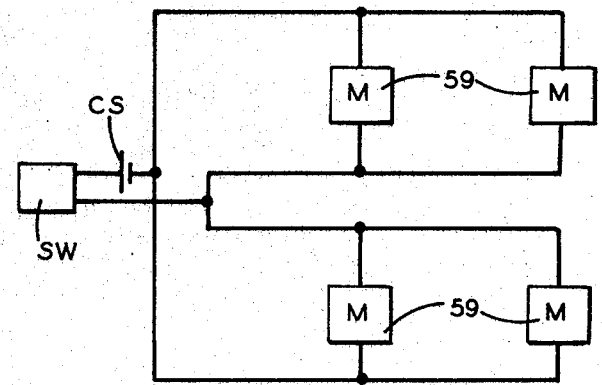
INVENTOR.
Mihai Alimanestianu
BY *Philip B. Hilbert*
ATTORNEY

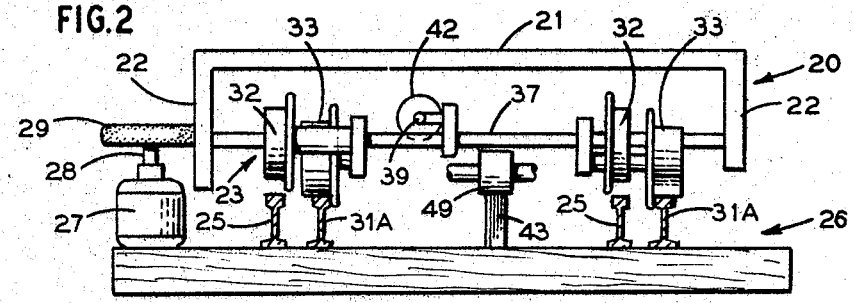
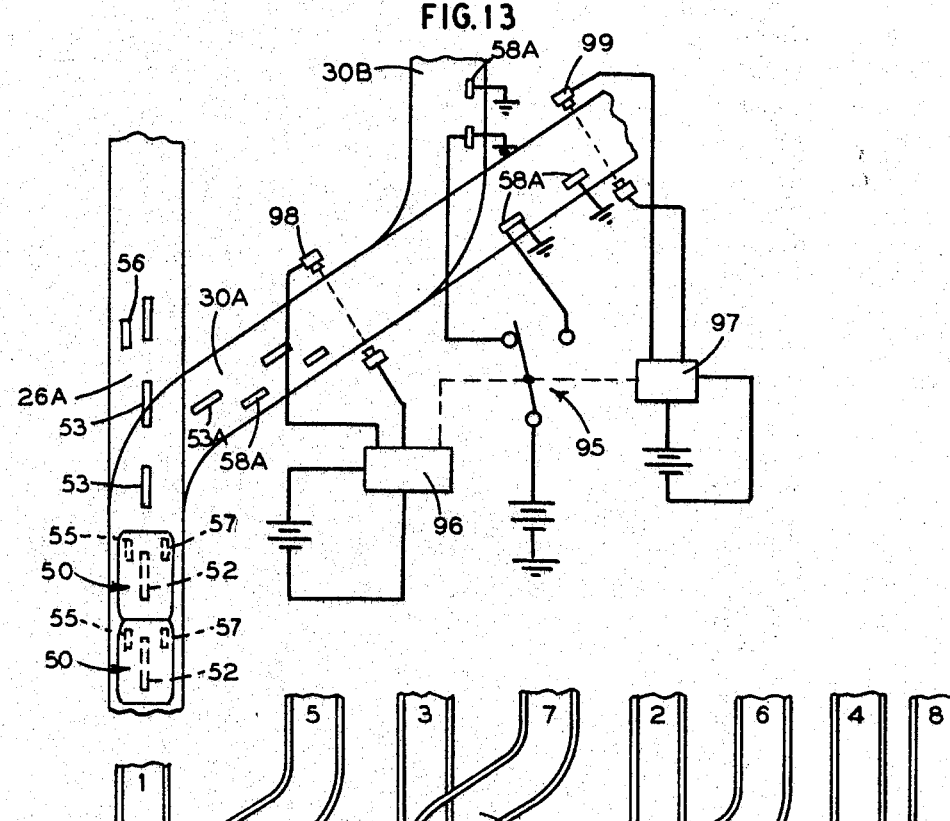
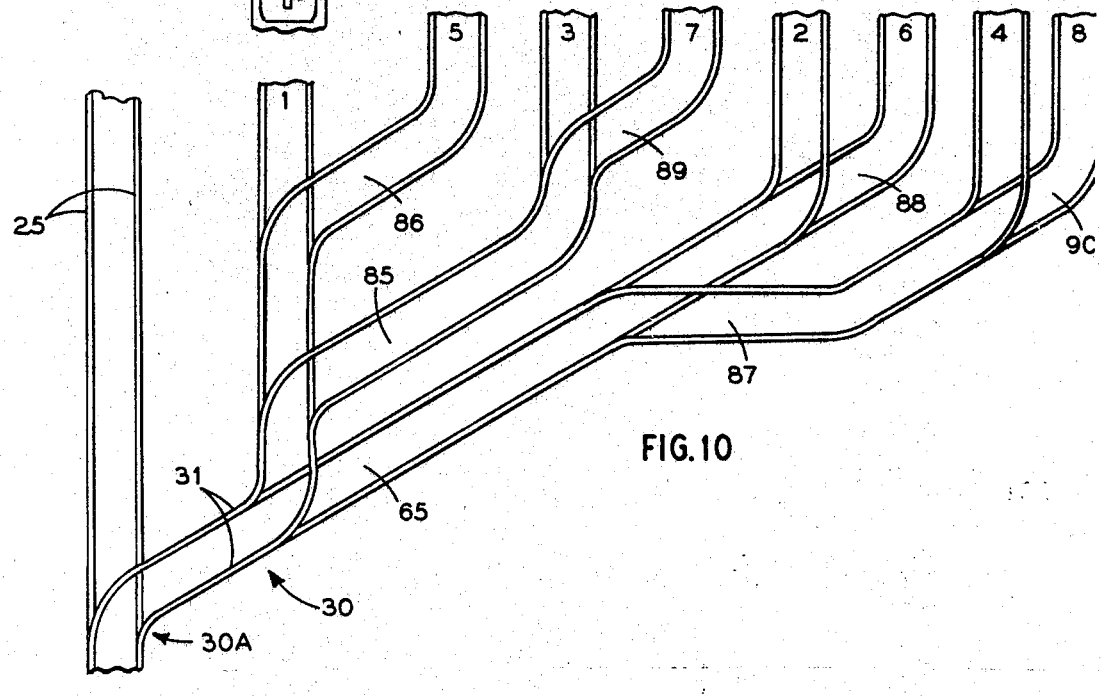

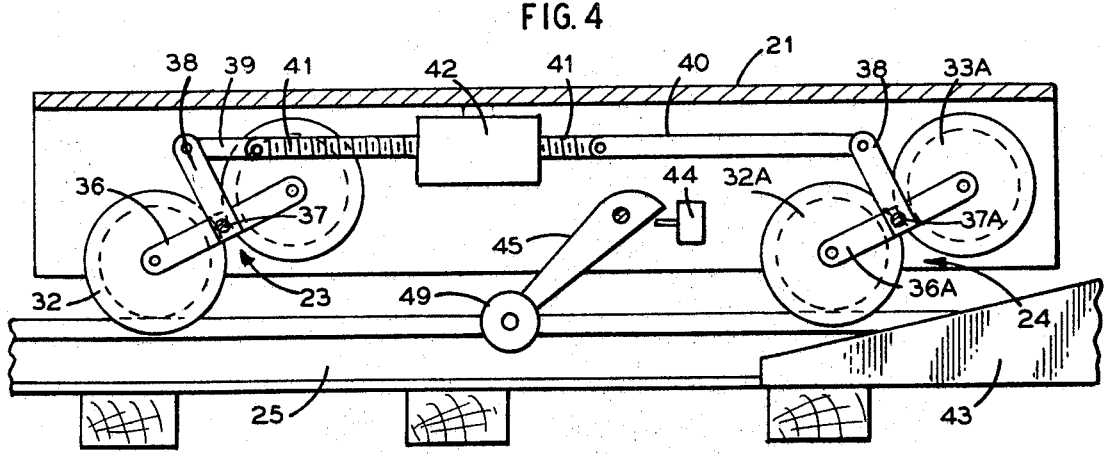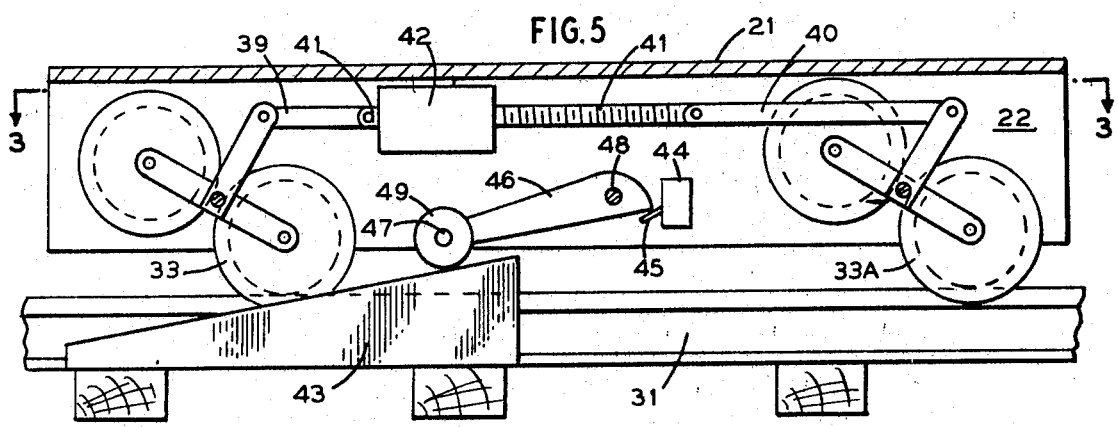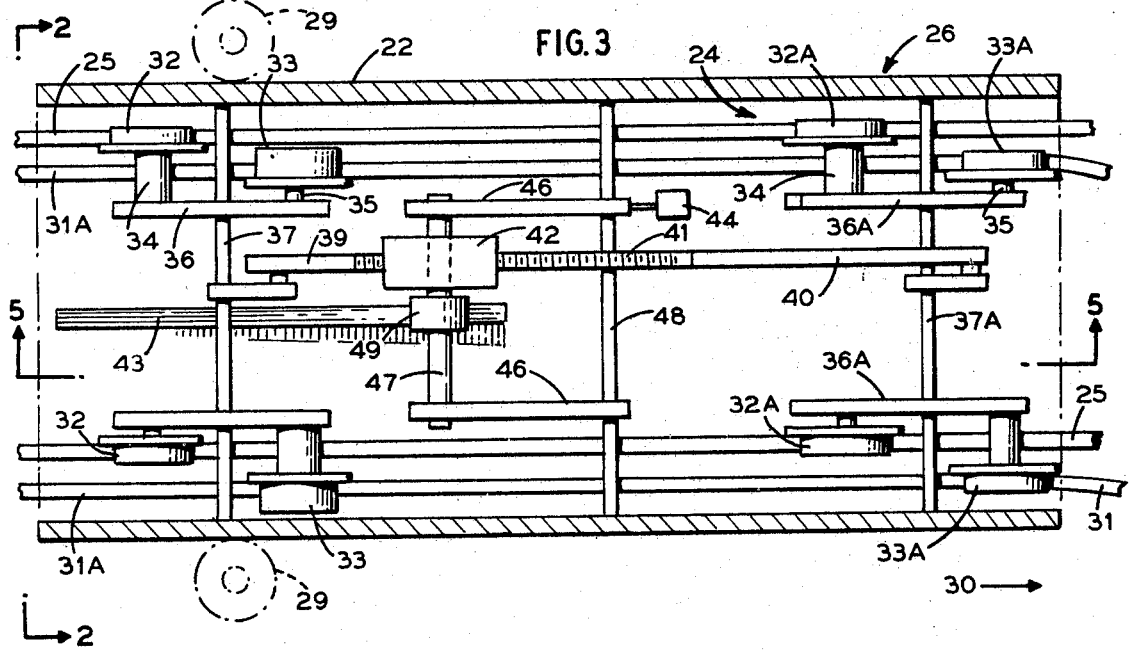

July 21, 1970 M. ALIMANESTIANU 3,521,567
AUTOMATIC SWITCHING SYSTEM FOR PROPELLED CARRIERS
Filed Aug. 21, 1968 4 Sheets-Sheet 4
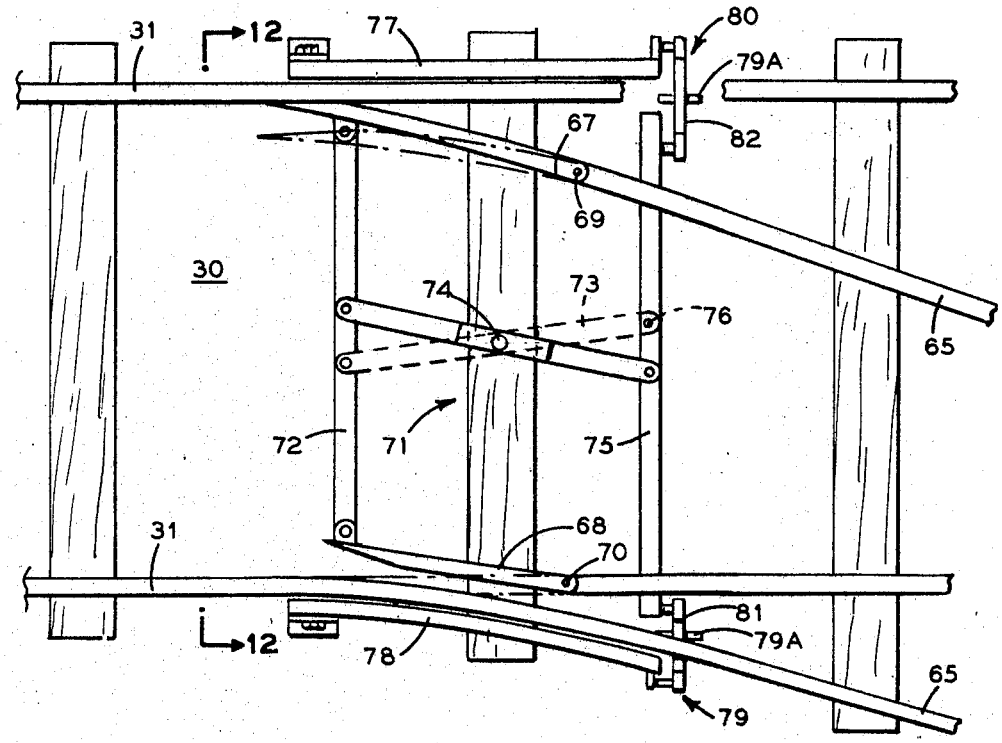
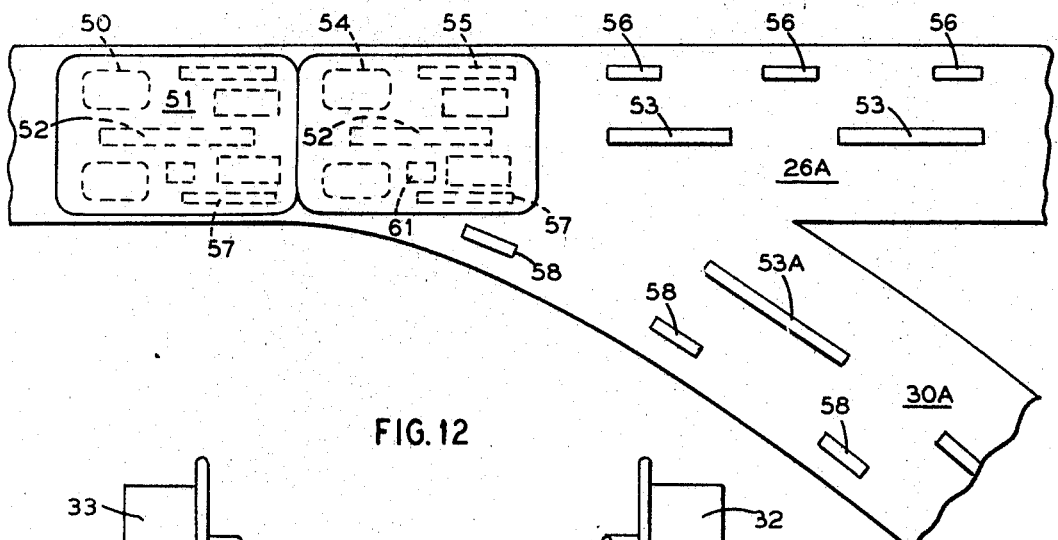
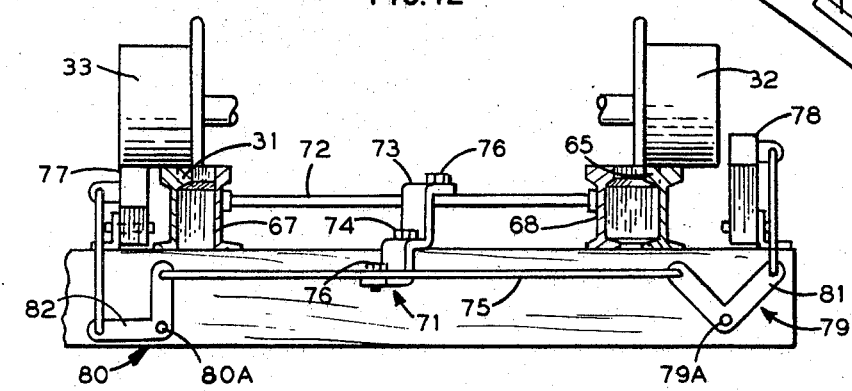

United States Patent Office 3,521,567
Patented July 21, 1970

3,521,567
AUTOMATIC SWITCHING SYSTEM FOR PROPELLED CARRIERS
Mihai Alimanestianu, 4 Locust Drive,
Upper Nyack, N.Y. 10960
Filed Aug. 21, 1968, Ser. No. 754,379
Int. Cl. B61j *3/00;* B61k *1/00*
U.S. Cl. 104—88     12 Claims

ABSTRACT OF THE DISCLOSURE

An automatic switching system for carriers propelled along a main path at a substantially constant, relatively high speed, the carriers being in closely spaced, serial relation; wherein each carrier may be directed to a selected branch path extending from the main path for continued movement along the branch path without the diminution of speed.

BACKGROUND OF THE INVENTION

It has been proposed to increase the traffic carrying capacity of conventional highways by the use of carriers which move over the highway at a uniform, relatively high speed; such carriers being loaded with motor vehicles, cargo containers or people. As the speed of the moving carriers may be held at a substantially constant value, the successive carriers may be in closely spaced relation. Further, with no interruption in the normal movements of such carriers, the maximum traffic capacity of a given highway may be realized.

Obviously, such a highway must have branch or secondary highways or paths extending at intervals therefrom to allow certain carriers to be diverted from the highway for further movement along selected paths. Since the carriers are adapted to move in closely spaced relation to each other, at a uniform high speed; switching of the carriers at the junction points of the main highway and the branch paths must take place without diminution of speed so that carriers continuing on the main highway, may do so without a decrease in normal speed.

Accordingly, an object of this invention is to provide a switching system for carriers moving along a main highway or path at a relatively high, constant speed and in closely spaced relation to each other, wherein the switching system includes components disposed in the main and branch paths, together with components disposed on the carriers and adapted to selectively interact with the components in the paths to effect a high speed switching operation at the junctures of the main and branch paths.

Another object of this invention is to provide a switching system of the character described, wherein the switch components on the carriers are individually preconditioned so as to interact with the switch components on the paths at selected junctures thereof, to thereby direct each carrier from the main path to a selected branch path.

A further object of this invention is to provide a switching system of the character described, wherein each branch path terminates in a pattern of branched accumulator paths for receiving carriers moving over the branch path, and switch means for automatically diverting successive carriers from the branch path to different terminal accumulator paths.

Yet another object of this invention is to provide a switching system of the character described, wherein the main and branch paths include track means over which the carriers are propelled, the carriers having movable sets of wheels for respectively engaging the main and branch tracks, with means for selectively moving the sets of wheels for engagement with branch tracks immediately in advance of a selected junction of the main tracks and a branch track whereby a selected carrier is switched from the main tracks to branch track without diminution of speed.

Still another object of this invention is to provide a switching system of the character described, wherein the carriers are propelled electrically over main and branch paths and are electrically guided over such paths, together with electrical means on each carrier which may be preconditioned to become effective at the junction of the main path and a selected branch path to divert such carrier from the main path to the selected branch path by way of the guide means associated with the branch path.

Yet another object of this invention is to provide a switching system of the character described, wherein each branch path terminates in a plurality of branched accumulator paths for receiving carriers, together with switch means at the junctures of the several paths which is automatically operated by the carriers moving thereover to change the switch positions.

Other objects of this invention will in part be obvious and in part hereinafter pointed out.

DESCRIPTION OF THE DRAWINGS

FIG. 1 is a plan view showing main and branch paths which is to be traversed by propelled carriers in accordance with a switching system embodying the invention;

FIG. 2 is an end elevational view showing one form of carrier having switching components in accordance with the instant invention;

FIG. 3 is a top plan view thereof with the base of the carrier removed;

FIG. 4 is a side elevational view thereof, with parts in section;

FIG. 5 is a side elevational view similar to that of FIG. 4; showing the switching wheels in their operative position;

FIG. 6 is a plan view showing main and branch paths which is to be traversed by electrically guided carriers and having an electrically operated switching system;

FIG. 7 is a side elevational view showing elements of the electrically operated switching system;

FIG. 8 is a circuit diagram therefor;

FIG. 9 is a bottom view of the electrically guided carrier;

FIG. 10 is a plan view showing branched accumulator paths for receiving the carriers;

FIG. 11 is a plan view showing a switching system for distributing carriers over the branched accumulator paths;

FIG. 12 is a transverse sectional view taken on the line 12—12 of FIG. 11; and FIG. 13 is a diagrammatic view showing an alternative form of a switching system for branched accumulator paths.

SUMMARY OF THE INVENTION

The instant invention relates to a transportation system for moving vehicles, objects, people or the like on carrier means propelled at substantially constant speed and in closely spaced relation to each other over high traffic density main paths from which branch paths diverge. The system further includes novel switching means for diverting selected carrier means from the main path to a selected branch path without diminution of speed of the switched carrier means as it moves from the main path to the branch path or of the remaining carrier means continuing their movement on the main path.

Also, the system of the invention further includes branched accumulator paths at the terminal end of each branch path with novel switching means for automatically directing the successive carrier means to individual terminal branched accumulator paths.

Further, the system herein includes coding of each carrier means at the commencement of its travel on the main path for automatic switching to a selected branch path.

DESCRIPTION OF THE PREFERRED EMBODIMENTS

Referring in detail to the drawings, and particularly to FIG. 1, 10 designates a main path, highway or the like in an area of high traffic density moving between points, not indicated. Carrier means generally indicated at 11 are adapted to move over path 10 at substantially constant speed and in closely spaced relation to each other to realize optimum traffic movements at relatively high speeds. Such carrier means 11 may be of the pallet type, hereinafter described in detail, for carrying motor vehicles, cargo, people, or the like.

The main path or highway 10 may have a number of branch paths diverging therefrom to terminate at destinations other than that of main path 10. By way of example, two such branch paths are indicated at 12 and 13. A series of individual carrier means 11, is shown at 11A, 11B and 11C. Such carrier means are precoded at the commencement of their movement on path 10, for selective switching into selected branch paths. Thus, it may be assumed that carrier means 11A is to be switched onto branch path 12 at the juncture 12A thereof with main path 10, while carrier means 11B is to be switched into branch path 13 at the juncture 13A thereof with main path 10. Carrier means 11C may be destined for some branch path other than 12, 13, or may continue to the terminus of main path 10, and is precoded accordingly.

The carrier means 11 may be propelled and guided for movement in the appropriate paths, by mechanical or electrical means. Thus, as shown in FIGS. 2, 3 a mechanically propelled and guided carrier is indicated at 20. Carrier 20 is in pallet form having a base 21 for carrying thereon a motor vehicle, cargo, or the like, and depending apron portions 22. Dual pairs of wheel assemblies generally indicated at 23, 24 are mounted apron portions for traversing main track or rail means 25 disposed in main path 26.

Carriers 20 are propelled along rail means 25 by a plurality of constant speed electric motors 27 disposed at suitably spaced intervals along path 26; said motors having vertically upstanding shafts 28 carrying annular friction members 29 which may take the form of resilient tires which frictionally bear against outer surface portions of apron portions 22 of carriers 20. It will be apparent that carriers 20 may thus be propelled along rail means 25 at relatively high, substantially constant speeds, which permits the successive carriers to be disposed in closely spaced or even touching relation.

Means is provided for switching selected carriers 20 from the main rails 25 in main path 26, to a selected branch path, as at 30, by way of branch rails 31. Branch rails 31 have the leading portion 31A thereof in parallel relation to adjacent main rails 25 for some distance in advance of the point at which branch rails 31 diverge from main rails 25.

To this end, wheel assemblies 23 are made up of main rail engaging wheels 32 and branch rail engaging wheels 33 in forwardly disposed and offset relation to wheels 32. Similarly, wheels assemblies 24 are made up of main rail engaging wheels 32A and branch rail engaging wheels 33A. Wheels 32, 33 are mounted on stub shafts 34, 35 respectively which in turn extend from brackets 36 at the outer ends thereof. Brackets 36 are fixed at their midpoints to a rocker shaft 37 journalled at its outer ends in suitable bearings on opposed portions of apron portions 22 of the carriers 20 at the rear portion thereof.

Similarly, wheels 32A, 33A of assemblies 24, are mounted on stub shafts 34, 35 respectively, which extend from the outer ends of brackets 36A which are fixed at midpoints thereof to a rocker shaft 37A journalled at its opposite ends on inner surface portions of apron portions 22 at the forward end thereof. Rocker arms 38 fixed to intermediate portions of rocker shafts 37, 37A in upstanding relation and are interconnected by links 39, 40 pivoted at outer ends thereof to the outer ends of rocker arms 38.

The inner ends of links 39, 40 are pivotally connected to a screw member 41 which passes through and in threaded engagement to a nut member, not shown, which is rotated in opposite directions by a reversible electric motor 42 which is suitably mounted on the underside of base 21 of carrier 20. As shown in FIG. 4, main wheels 32, 32A are shown in rail engaging position, while branch wheels 33, 33A are in a raised inoperative position; thus allowing carrier 20 to be propelled along main rails 25.

Means is provided for rendering motor 42 operative to shift wheel assemblies 23, 24 to bring branch wheels 33, 33A to their operative rail engaging position with branch rails at portions 31A thereof, while lifting main wheels 32, 32A to a raised, inoperative position. To this end, tapered cam members 43 are disposed in path 26 in advance of the juncture of branch paths 30 with path 26. Said cam members 43 are disposed in parallel to rail means 25, with each member 43 in a different lateral position at each of said rail junctures.

An electric control switch 44 having an operating arm 45 and connected in circuit with motor 42 and a current source, not shown, is mounted for pivoted movement on bracket arms 46 through a cross member 47 connecting the outer ends of arms 46 which are pivoted at their inner ends on a cross shaft 48. Switch 44 has its arms 45 terminating in a cam roller 49. Arm 45 may be moved laterally on a cross member 47 to selected positions so as to be aligned with a selected cam member 43.

It will be apparent that each carrier 20 may be precoded by suitable location of switch arm 45 so that switch 44 is moved to a position closing the circuit to motor 42 to operate the same, thereby shifting branch wheels to their operative position engaging branch rail portions 31A, as indicated in FIG. 5. The motor 42 may be reversed by suitable reversing switch means, not shown, to restore the main wheels 32, 32A to their normal main rail engaging position, when so desired.

It is understood that carrier means may be propelled and guided electrically by the use of linear electric motor means and combination armature and guide coil means, as set forth in copending application Ser. No. 546,317, filed Apr. 29, 1966, and now abandoned. Thus, as shown in FIG. 7, carrier 50 having a base portion 51 is provided with a longitudinally extending, centrally located armature member 52 which is correlated with a series of stator coils 53 located in path 26A to form a linear motor for propelling said carrier 50, upon suitable energization of the successive stator coils 53, in a manner known in the art. The carrier means 50 may be located in spaced relation to path 26A by air cushion means generally indicated at 54 and operated in a manner known in the art.

Carriers 50 are guided along path 26A by a guide armature 55 which cooperates with guide stator coils 56 disposed in path 26A. Similarly, carriers 50 are guided along branch paths 30A by a guide armature 57 which cooperates with guide stator coils 58 disposed along branch paths 30A. Guide armatures 55, 57 are arranged for movement between operative positions and inoperative positions, to thus effect a switching action for each of carriers 50; armatures 55 being in an operative position while armatures 57 are in an inoperative position, allowing carriers 50 to move along main path 26A; while with armature 55 in an inoperative position and armature 57 in an operative position while approaching the juncture of main path 26A with a selected branch path 30A, carrier 50 will be diverted to move along the selected branch path 30A.

To this end, armature 55 is mounted beneath base portion 51 of carriers 50 by screw members 58 adapted to be rotated by motors 59, said screw members passing in threaded engagement with nut members, not shown in said armature 55. Similarly, armature 57 is arranged for vertical movement by means of screw members 58 and motors 59, which are reversible. As shown in the circuit diagram of FIG. 8, a magnetically actuated switch SW is connected in circuit with motors 59 and a current source CS so that upon closing of switch SW armature 55 is lowered by operation of its motors 59 while simultaneously armature 57 is raised by its motors 59. Limit and reversing switches, not shown, control the operation of motors 59 to properly locate each of armatures 55, 57 in operative positions thereof, as required.

Pallets 50 may be precoded at the time they commence to move over main path 26A so that they will be switched off at selected branch paths 30A. To this end, switch SW is arranged for movement on a motor operated screw member 60 to selected transverse positions. Correspondingly, switch operating coils 61 are located at each juncture of main path 26A and a branch path 30A; the coil 61 at one of said junctures being a position different from the coils 61 at the other junctures. It follows, that at the onset of the movement of carriers 50 on main path 26A, the switch SW thereof is preset to a determined position which is then in alignment with a particular coil 61 at the juncture of the desired branch path 30A turnoff. Coils 61 are suitably energized by means not shown, to provide the magnetic field for operating magnetic switches SW.

When carriers 20, 50 reach the terminal ends of branch paths 30, 30A; or for that matter, the terminal end of main path 26; said carriers are unloaded of their contents in the form of vehicles, cargo, or the like; and the unloaded carriers must be accumulated. To this end, branched accumulator paths are provided, as shown in FIG. 10, wherein one or more of carriers 20, 50 may be accomodated on branch path portion.

Accordingly, there is provided switch means at the various junctures of the branched accumulator paths, which are automatically operated by each carrier passing such junction, to switch the next adjacent carrier to a different accumulator track portion.

Thus, as shown in FIGS. 11, 12, accumulator rails 65 extend from branch rails 31 with a laterally shiftable switching rail portion 66 at the juncture thereof. Switching rail portion 66 comprises rail members 67, 68 pivotally connected to one of the rails 65 and 31 respectively, as at 69, 70. Rail members 67, 68 are interconnected by a linkage assembly 71 comprising a cross link 72 and a pivot arm 73 extending from a midportion of link 72 and pivoted at a midportion thereof as at 74.

The assembly 71 further includes an operating arm 75 pivotally connected at a mid portion thereof to the forward end of arm 73, as at 76. The rail members 67, 68 are adapted to be shifted between a position indicated in full lines to a position indicated in dotted lines, see FIG. 11, by cam members 77, 78 which are respectively located adjacent a rail 31 and a rail 65. Cam members 77, 78 are pivoted at their rear ends for vertical movement and are connected at their forward ends to the outer ends of operating arm 75 by way of bell crank levers 79, 80 pivotally mounted at 79A, 80A respectively. The free ends of arms 81, 82 of levers 79, 80 are linked to the outer ends of cam members 77, 78 respectively.

The cam members 77, 78 are so arranged such that with cam member 77 in its raised position, cam member 78 is in its depressed position; and vice versa. Thus, assuming that a carrier 20 is moving over rails 31, the switch rail members 67, 68 will be in the position indicated in solid lines, FIG. 11. However, as the rear wheel 33 has an extended axial dimension, cam member 77 will be engaged and depressed so as to operate the linkage 71 to shift the rail members 67, 68 to their other position indicated in dotted lines.

Thus, the next succeeding carrier 20 will be switched to move over accumulator rails 65. However, this will cause wheel 33 of extended axial dimension to engage cam member 78 and thus operate linkage 65 to shift rail members 67, 68 to their original position. It follows that each carrier 20 is effective to operate the linkage 65 at any juncture of rails 31 and accumulator rails 65 to distribute said carriers 20 over any given pattern of rails.

A typical rail pattern is shown in FIG. 10, wherein, accumulator rails 65, 85 and 86 extend from spaced points along rails 31; rails 87, 88 extend from rails 65; and rails 89, 90 extend from rails 85, 87 respectively to provide terminal points indicated at 1 to 8 inclusive. It is understood that the switching arrangement shown in FIG. 11, is provided at each of the junctures indicated in FIG. 10, with successive carriers 20 being diverted to terminal points 1 to 8 through the alternative operation of the same, as pointed out above.

In the case of electrically guided carriers 50, switching is provided for alternate distribution thereof over a distribution pattern similar to that described above by the use of photocell controlled switch means for effecting energization and deenergization of guide coils 58, 58A in paths 30A, 30B respectively. Thus, as shown in FIG. 13, a two position toggle switch 95 is shifted by solenoids 96, 97 having photocells 98, 99 in circuit therewith.

Photocells 98, 99 are suitably located at the several path junctures, so that as each carrier 50 passes over a given path, switch 95 is operated to shift power to guide coils in the alternative path to guide the next carrier 50 over said alternative path, which in turn is again effective to operate switch 95 to restore power to the guide coils in the original path.

The carriers 20 or 50 at their terminal points 1–8, after unloading, may be further utilized by passing the same to further extended portions of paths 26, 26A after reloading, or in an empty condition. Also, such reloaded or empty carriers may be recirculated in paths of opposite direction to that of paths 26, 26A by passing the same to said paths of opposite direction, in a manner suggested in copending application Ser. No. 546,317, filed Apr. 29, 1966.

I claim:

1. A carrier transportation system comprising a main path and branch paths respectively extending from said main path at spaced points along the main path, a plurality of carrier means, means for propelling said carrier means at a substantially uniform speed and in closely spaced serial relation to each other, first coacting means on each carrier means and said main path for directing said carrier means over said main path, second coacting means on each carrier means and each branch path for directing said carrier means over said branch paths, means for deactivating said first directing means and activating said second directing means for switching said carrier means to direct selected carrier means for movement over selected branch paths, and means for preconditioning said deactivating and activating means for conjoint operation at selected junctures of said main path and said branch paths.

2. A system as in claim 1 wherein said preconditioning means comprises an actuating member on each carrier means and a plurality of means respectively located on said main path at each juncture thereof with a branch path for operating said actuating members, and means for preadjusting the relationship of each of said actuating members and said operating means for operation of selected actuating members as the carrier means approaches the junctures of the main path and the branch paths.

3. A system as in claim 1 wherein said first coacting directing means comprises main rail means on said main path and first wheels on said carrier means for traversing said main rail means, said second coacting directing means comprising branch rail means on said branch paths and second wheels on said carrier means for traversing said branch rail means, and means on each carrier means for movably shifting said first wheels from engagement thereof with said main rail means while shifting said second wheels into engagement with said branch rail means.

4. A system as in claim 3, wherein said last mentioned means comprises bracket means movably mounted on each carrier means for carrying said first and second wheels, motor means for moving said bracket means to selectively locate said first and second wheels in positions operatively engaging rail means, means for actuating said motor means comprising cam means located in said main path at the junctures thereof with said branch paths, the cam means at each of said junctures being located in a position different from that of said other cam means, and switch means for said motor means movably mounted on each carrier means for shifting to selected positions thereof for alignment with selected cam means at a selected juncture of said main path and said branch paths for actuating said motor means.

5. A system as in claim 1, wherein said propelling means comprises coacting electrical linear motor elements on said carrier means and on said paths, said first directing means comprising electrical guide coils along said main path and first armature means on each carrier means for coaction with said guide coils, said second directing means comprising second electrical guide coils along each branch path and second armature means on each carrier means for coaction with said second guide coils, means for mounting said first and second armatures for selective movement to operative positions thereof, means for controlling the operation of said armature moving means comprising first actuating means located in said main path at junctures thereof with said branch paths, the first actuating means at each juncture being in a position different from that in the other junctures, and second actuating means movably mounted in each carrier means for location in selected positions thereof for operation by a selected one of said first actuating means.

6. A system as in claim 5 wherein each branch path terminates in a plurality of branched accumulator paths, two position switch means at the junctures of said branch and branched accumulator paths, third electrical guide coils along each branched accumulator path, said last mentioned switch means comprising circuit means for selectively energizing said second and third guide coils and means responsive to the passage of each carrier means at said junctures for shifting said switch means from one position thereof to the other position thereof.

7. A system as in claim 1 wherein each branch path terminates in a plurality of branched accumulator paths for respectively receiving single carrier means, two position switch means at the junctures of said branch path and said branched accumulator paths, each switch means being responsive to the passage of a carrier means thereover for shifting said switch means from one position thereof to the other position thereof, to thereby distribute said carrier means over said branched accumulator paths.

8. A system as in claim 7 wherein said first directing means comprises main rail means on said main path and first wheels on said carrier means for traversing said main rail means, said second directing means comprising branch rail means on said branch paths and second wheels on said carrier means for traversing said branch rail means, said first and second wheels being respectively movable to positions for operatively engaging said main and branch rail means, accumulator rail means on said branched accumulator paths, each of said branch and accumulator rail means having shiftable switch portions at the junctures thereof, switch means at each of said junctures for shifting said switch rail portions in response to passage of carrier means thereover, whereby successive carrier means are alternately directed for movement over said branch rail means and said accumulator rail means.

9. A system as in claim 8 wherein said switch means comprises linkage means operatively connected to said shiftable rail portions and movable means for operating said linkage means said movable means being disposed for engagement by the second wheels of said carrier means for shifting said shiftable rail portions to one position thereof, and second movable means for operating said linkage means, said second movable means being disposed for engagement by second wheels of carrier means immediately following said first mentioned carrier means for shifting said shiftable rail portions to another position thereof.

10. A switching system for carrier means having rearwardly disposed switching wheels, said carrier means being movable over first rail means and second rail means diverging from said first rail means, said system comprising laterally shiftable switching rail portions at the juncture of said first and second rail means for selectively directing said carrier means over said first and second rail means, switching means comprising a linkage assembly operatively connected to said switching rail portions, means for operating said linkage assembly comprising movable cam means located adjacent the juncture of said first and second rail means for engagement by the switching wheels of said carrier means to thereby shift said switching rail portion to a position for directing second carrier means immediately following said first mentioned carrier means to rail means other than the rail means over which the first mentioned carrier means moved.

11. A switching system as in claim 10 wherein said switching means comprises second movable cam operatively connected to said linkage assembly and located adjacent the juncture of said first and second rail means for engagement by the switihing wheels of said second mentioned carrier means to thereby shift said switching rail portion to its original position for directing third carrier means immediately following said second carrier means to the rail means traversed by said first mentioned carrier means.

12. A system as in claim 11 wherein said first mentioned cam means is located adjacent and in parallel relation to one of said first rail means and said second mentioned cam means is located adjacent and in parallel relation to one of said second rail means, said switching wheels having rail engaging portions for simultaneously engaging each of said cam means and the rail means associated therewith.

References Cited

UNITED STATES PATENTS 3,291,070   12/1966   Bradt _____ 104—88

DONALD F. NORTON, Primary Examiner